No. 731,608. Patented June 23, 1903.

UNITED STATES PATENT OFFICE.

WILLIAM OWEN, OF WOKING, ENGLAND.

PROCESS OF MANUFACTURING ARTIFICIAL STONE.

SPECIFICATION forming part of Letters Patent No. 731,608, dated June 23, 1903.

Application filed December 5, 1902. Serial No. 134,029. (No specimens.)

*To all whom it may concern:*

Be it known that I, WILLIAM OWEN, of Woking, in the county of Surrey, England, have invented certain new and useful Improvements in Processes of Manufacturing Artificial Stone; and I hereby declare that the following is a full, clear, and exact description of the same.

This invention relates to a process for the manufacture of artificial stone, its object being to combine suitable and cheap materials by physical and accelerated chemical actions into durable and economically-manufactured commercial commodities, such as bricks, blocks, slabs, or the like.

In the manufacture of artificial stone clean sand, tailings, granulated slag, or any other suitable grit or refractory material may be used in combination with fresh burnt and ground lime or other cementing material. Assuming that sand and lime are the ingredients, the object and the method of the process may be described as follows:

The object has been generally described in the above paragraph—namely, by the application of physical and chemical actions to combine together the sand and lime into homogeneous articles capable of resisting great pressure and to withstand the injurious effects of climate and atmospherical agencies. A critical examination of the ingredients shows, first, that sand considered by atoms is capable of resisting high pressure and is absolutely impervious to the deleterious effects of climate or the atmosphere of cities and other densely-populated districts and manufacturing centers. It therefore naturally follows that if it can be combined together in a compact mass by some combining element which is also possessed of the foregoing qualities of resistance a technically-useful and commercially-valuable product is evolved. Second, lime, more especially such as is produced from burnt limestone, will under certain circumstances rapidly reassume or reabsorb in a short period of time the component parts which have been expelled from it in the process of burning.

The difference between the excessively-hard limestone and the soft powder-like nature of burnt lime is that the application of heat has expelled from the limestone such elements as moisture and the carbonic-acid gases which it contained, thus depriving it of the agents or powers of adhesion. If, however, means can be devised to reinstate these agents or powers of adhesion, partly by reabsorption of the expelled components and partly by creating new elements of combination, a satisfactory result can be attained for the purpose under consideration.

It has been proved that burnt lime when slaked will under normal conditions form new combining substances—namely, carbonates of lime and hydrosilicates of lime—resulting in the hardening of the substances, the process of hardening or induration continuing indefinitely. It has also been proved that hydrated lime will readily absorb carbonic-acid gas and form therewith the carbonate of lime in the state in which it was originally constituted. Granted, therefore, that these facts are undisputed and that under normal conditions by the slow process of time a hard and durable substance can be produced, the question resolves itself into the solution of the problem of accelerating by abnormal conditions and simultaneously the twin processes of creating carbonate of lime and hydrosilicate of lime in a short period of time. In describing the following method or process it should be stated that although the immediate result is an improvement on the work of nature, inasmuch as the product is free from laminations, vents, &c., being of uniform texture and density throughout, yet the stone will continue to harden and indurate indefinitely after manufacture until it ultimately becomes harder in the mass than a state of nature by its own action could produce.

The first essential part of this method is to have suitable ingredients. The sand should be clean, not exceeding three per cent. of loam or other foreign matter. It should be sharp and uniform in size—not too fine or too coarse. An acceptable average size of the sand should be forty to fifty mesh. This applies also to slag, quartz, or other silicious material when used instead of sand. The lime should be properly burnt and freshly ground to seventy or seventy-five mesh. The sand and lime should then be intimately mixed in proper proportions when in a dry state. The mixing should be thoroughly done, so that each particle of sand is coated with the finer particles of lime. The proportions for ordinary quality of stone may be approximately taken as eighty-five per cent. of sand and fifteen per cent. of lime, by weight; but this proportion necessarily depends upon the hardness which it is desired the stone should have and also upon the quality of the limestone from which the lime is formed—that is, its richness in carbonates. For stone of a harder quality a slightly greater percentage of lime and a slightly less percentage of sand will be used than that above stated. The mixture should then be slaked, preferably in a trough into which moisture at a low pressure can be gently introduced. Moisture such as steam or vapor is preferable to water for the slaking of the lime in the mixture, as it will effect the purpose without washing off the coatings of lime with which the particles of sand are covered, as is the case by the violent application or addition of water. It is an important point to maintain the close contact of the lime and sand attained in the dry mixing; otherwise the mixture will have its weak spots, owing to the absence of any combining elements to maintain the aggregation of sand together. Sand cannot of itself have any strength of adhesion, and it is unsafe to rely upon the adhesion of any uncoated particles of sand depending upon the adhesion of the surrounding particles. When thoroughly slaked and cooled, the mixture is subjected to high mechanical pressure in a mold to form it into a compact or homogeneous mass, which when so formed is relieved of the mechanical pressure and subjected to a natural or artificial drying action. When partially dried, the molded or formed articles are placed in an indurating-chamber and subjected to the action of moisture for a sufficient period to allow them to become thoroughly saturated, and during or at the end of this period carbonic-acid gas is admitted to the indurating-chamber direct from the lime-burning retorts or other convenient source, the inflowing gas being mixed with moisture either before, after, or during its entry into the chamber with the saturating moisture to enable the indurated articles to readily absorb the carbonic-acid gas simultaneously with the absorption of the moisture and cause the simultaneous formation of the carbonate of lime with the hydrosilicates. When sufficient time has elapsed to complete the induration of the molded or formed articles in the indurating-chamber, the flow of the carbonic-acid gas and the moisture is gradually reduced and finally stopped. During the flow of the moisture and carbonic-acid gas the chemical reaction taking place in the molded articles is the reconstitution of the lime carbonates by the contact and absorption of the carbonic-acid gas and the formation of the hydrosilicate of lime by the combination of hydrated carbonates and the soluble silica present in the pressed mixture. Under such abnormal conditions thus created these hardening elements are very rapidly formed, and it is found by experience that the molded articles will in a very short time be sufficiently indurated to be removed from the indurating-chamber and may, if desired, be immediately used in masonry.

Longer periods of exposure to the treatment in the indurating-chamber will result in a corresponding increase in the hardness of the articles until the ultimate power of absorption and induration is attained.

On removal from the indurating-chamber if immediately tested the crushing strains of the articles will be found equal to those of a very high class building-stone, while experimental tests prove that the exposure will continue to harden the articles indefinitely. I desire it to be understood that the same process is also applicable to the induration of artificial stone made of granulated slag, tailings, or other refractory material combined with lime.

Having thus fully described my invention, what I claim as new, and desire to secure by Letters Patent, is—

The herein-described process for manufacturing artificial stone, comprising the mixing of from forty to fifty mesh sand with seventy to seventy-five mesh lime in the dry state so that each grain of sand is coated with finer particles of lime, the said sand and lime being mixed in the proportions of eighty-five per cent. sand and fifteen per cent. lime, then subjecting the product to enough vapor to properly slake the lime at a low pressure so as to not wash the coating from the sand and after the product is slaked and cooled subjecting the same to a high pressure to form it into a compact mass, drying the said compact mass and admitting moisture to said mass until it is completely saturated and during this saturation admitting carbonic-acid gas, then gradually reducing and finally stopping the admission of the moisture to the mass until the mass is in a hardened state.

Toronto, November 6, 1902.

WILLIAM OWEN.

In presence of—
C. H. RICHES,
A. M. CHISHOLM.